United States Patent [19]

August

[11] Patent Number: 4,800,090
[45] Date of Patent: Jan. 24, 1989

[54] INFRARED AND MICROWAVE ENERGY TREATMENT OF FOOD

[75] Inventor: Joseph R. August, Jupiter, Fla.

[73] Assignee: Musser's Potato Chips, Inc., Mountville, Pa.

[21] Appl. No.: 24,475

[22] Filed: Mar. 11, 1987

[51] Int. Cl.⁴ .............................................. A23L 1/025
[52] U.S. Cl. ...................................... 426/243; 426/248
[58] Field of Search ............... 426/241, 242, 243, 248, 426/804

[56] References Cited

U.S. PATENT DOCUMENTS

| | | | |
|---|---|---|---|
| 2,286,644 | 6/1942 | Pringle et al. | 426/248 |
| 3,934,042 | 1/1976 | Stoutz | 426/248 |

FOREIGN PATENT DOCUMENTS

| | | | |
|---|---|---|---|
| 3233819 | 3/1984 | Fed. Rep. of Germany | 426/242 |
| 3443218 | 5/1986 | Fed. Rep. of Germany | 426/242 |

*Primary Examiner*—Arthur L. Corbin
*Attorney, Agent, or Firm*—Burns, Doane, Swecker & Mathis

[57] ABSTRACT

A process and apparatus for preparing a cooked food product such as a potato chip without the use of oil. The process and apparatus involves subjecting sliced potato pieces to a sufficient amount of infrared energy to warm the exterior of the sliced potato pieces followed by exposing the sliced potato pieces to microwave energy for a period of time sufficient to warm the interior of the sliced potato pieces and, finally, exposing the sliced potato pieces to a sufficient amount of infrared energy to achieve browning. The crisp, chip-type snack food product thereby produced is low in calories.

17 Claims, 1 Drawing Sheet

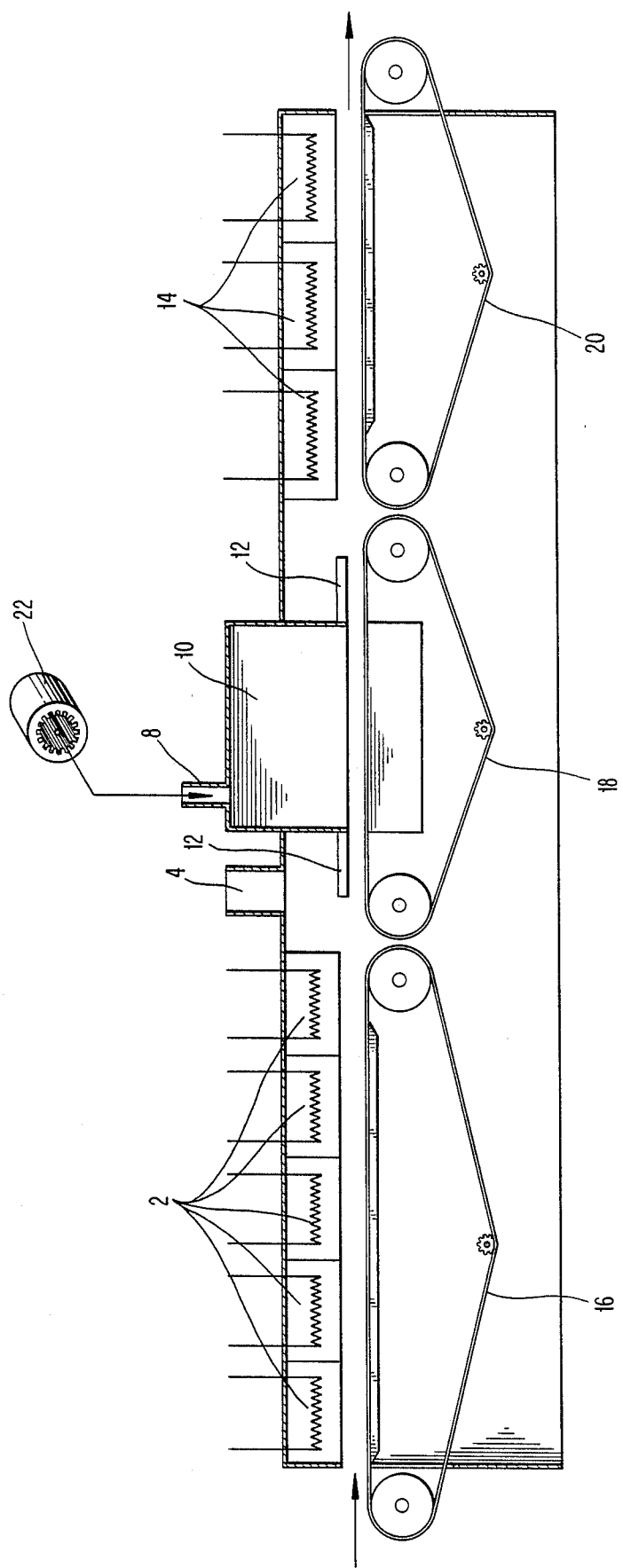

INFRARED AND MICROWAVE ENERGY TREATMENT OF FOOD

FIELD OF THE INVENTION

The present invention relates to the preparation of snack food. More particularly, the present invention relates to a process for the preparation of low-calorie potato chips. The process involves precooking food using infrared energy, followed by a microwave cooking step and finally a browning step using infrared radiation. The subject process may be conducted without the use of any form of cooking oil.

BACKGROUND OF THE INVENTION

A variety of methods are known in the art for preparing snack foods. However, most, if not all, of these methods rely on cooking or processing techniques which increase the caloric value of the basic foodstuff used as the starting material. Perhaps the best example of this increased calorie processing technique is fried potato chip products. The usual method of frying potato chip products involves the slicing of raw potatoes, the insertion of these slices into a reservoir of hot fat for a predetermined period of time so that the slices are fried to a crisp state, followed by the removal of the fried chips from the fat. The effect of frying on the potato slices is to reduce the water content of the slices while allowing oil uptake. This results in the appropriate surface color and crispness. Fresh potatoes contain approximately 85% moisture. The finished potato chip product contains from 30% to 45% oil or fat of the total weight of the potato chip and less than 5% moisture.

A high fat content is undesirable for a number of reasons. Obviously, the caloric value of the final product would be increased after processing. In addition, a low fat content chip cannot be made with deep fat frying processes and the fat content cannot be controlled since fat is absorbed throughout the frying operation. The deep fat frying process also shortens the shelf stability of the potato chip. Moreover, the frying process is difficult to control and often results in overly cooked potato chips.

The disadvantages associated with the use of the foregoing prior art process have been noted. A number of improvements have been designed to overcome these disadvantages. However, the preparation of a low calorie snack food product without the use of cooking oil or some other additive has not yet been achieved.

U.S. Pat. No. 3,576,647 discloses a process for preparing potato chips having a relatively uniform color, texture and shape. To achieve this degree of uniformity, thin pieces of edible dough are shaped to a predetermined surface conformation. The prepared dough is contained in mold halves and is then placed in contact with a frying medium. A fried product of relatively uniform color, texture and shape is obtained.

Microwave heating is a relatively new procedure used in the production of potato chips. U.S. Pat. No. 4,283,425 discloses a process for preparing low fat potato chips by coating a raw potato slice with globular protein and subjecting the raw coated slice to microwave heating. However, even though the use of a deep fat fryer has been eliminated, the use of an edible oil is still suggested.

In the prior art processes, the presence of oxygen and water vapor within the final package reacts with the frying fat retained by the chips. The fat becomes rancid and thereby imparts an undesirable rancid odor and taste to the chips. The water vapor causes the chips to lose crispness and become stale in flavor. As a result, the normal shelf life of potato chips and other snack food products is relatively short, being on the order of two or three weeks because of the onset of oxidation rancidity and staling. After this period, the chips are not in an acceptable condition and those not sold and consumed by that time are usually discarded. Thus, oil-free or fat-free potato chips are desirable.

OBJECTS OF THE INVENTION

Thus, it is a general object of the present invention to provide a novel process for preparing low-calorie cooked food without immersing the food in frying oil, while maintaining good color, texture, shape and pleasant taste in the final product.

It is an object of the present invention to prepare a cooked food product by cooking food pieces having a high initial moisture content to obtain a low moisture content.

It is an additional object of this invention to provide potato chips having a fat content significantly lower than that obtained by current commercial processes.

It is another object of the present invention to provide a process for preparing snack food which requires minimal energy consumption.

It is a further object of the present invention to provide such a process which may be conducted in a continuous manner.

It is also an object of the invention to provide a process for heating potato slices combining versatility, safety and an efficient energy transfer from an energy source to the food articles.

A still further object of the present invention is to provide a snack food product having a long shelf life.

It is another object of the present invention to provide an apparatus for making a low calorie snack food.

These and other objects will be more apparent when taken in conjunction with the following disclosure, accompanying drawing and the appended claims.

BRIEF DESCRIPTION OF THE DRAWING

The Figure represents a schematic view of an apparatus for conducting the process of the present invention in a continuous manner.

SUMMARY OF THE PREFERRED EMBODIMENTS

In accordance with the present invention, it has been found that a low fat potato chip can be prepared without deep fat frying while maintaining a pleasant taste and texture in the final product. The process involves subjecting sliced potato pieces to an infrared precook, followed by high intensity microwave energy for a period of time sufficient to warm the interior of the potato slice and exposing the warmed potato slice to an infrared source to achieve browning of the potato slice. A low-calorie, crisp, chip-type snack food product is thus obtained.

An apparatus for preparing crisp, chip-type snack food products from potato slices comprises, in accordance with the present invention, means for providing infrared energy to the potato slices in the precook stage. The apparatus further comprises means for providing microwave energy to the precooked potato slices in the cooking stage and means for providing infrared energy to the cooked potato slices to brown them. Also, the potato slices are transported from stage to stage by a suitable conveyor.

DESCRIPTION OF THE PREFERRED EMBODIMENTS

The varieties of potatoes preferred for deep fat fried potato chips, i.e., Kennebec, Nordchip, Oneida, Monona, Tobique and the like, may be employed in this invention. Other varieties whose sugar contents have made them undesirable as "chipping" potatoes may nonetheless be employed satisfactorily in this invention. These poor "chipping" potatoes have high reducing sugar contents, 0.5–1.0% glucose and higher. This sugar reacts during frying to form an undesirable dark brown color in the finished potato chip. As the moisture decreases below about 6–8% during deep fat frying, the rate of browning is accelerated if reducing sugars are present in the potato and an unsatisfactory product because of the dark brown color is often produced. However, in the microwave heating process of this invention, excessive browning is not obtained even with the high glucose potatoe varieties. Thus, such "non-chipping" varieties as Irish Cobblers, and the like, may be usefully employed in practicing this invention.

Although the practice of this invention usually involves the preparation of potato chips from raw potato slices, it may also be practiced on lyophilized potato slices. In either case, the product produced by the process of the present invention has the appearance of deep fried potato chips and possesses the taste and crispness of the more conventional product.

In preparing the potatoes for the present process, the potatoes are generally washed, peeled, sliced and water-washed. However, such procedures may not be required, for instance, if it is desired to retain the peel on the finished potato chip product. Optionally, the slices may be soaked in a dilute (e.g., 0.1%) aqueous solution of sodium metabisulfite or tetrabutyl hydroquinone for 15–60 minutes, followed by washing with cold water to remove residual quantities of the sulfite or the hydroquinone. The sulfite has been used as a bleaching agent while the hydroquinone reacts with the sugar in the potato to help avoid the dark color such sugar often produces in the finished potato chips. Optionally, the starch may also be removed from the potato using techniques well known in the art.

After the potato slices are water washed, the excess water is removed by, for example, blotting the slices dry with paper toweling or exposing the slices to a stream of warm air.

Prior to processing, the potato slices may also be optionally coated with a salt brine solution. Suggested types of salts include sodium chloride, potassium chloride and the like. These salts suitable for use on edible food products are well known in the art. The saline solution may be applied to the outer surface of the individual slices by a variety of techniques. A satisfactory coating is obtained by soaking the slices in the solution and then draining off the excess solution. Spraying the solution onto the slices is also satisfactory provided the slices are turned so as to obtain a coating on all surfaces.

The process of the present invention may be conducted as a batch process, however, a continuous process is preferred. The foregoing pretreatment alternatives may be conducted independent of the subject process or alternatively the pretreatment may be conducted as one step in the continuous process. That is, the pretreatment may be conducted directly on potato slices transported by a conveyor for immediate processing in accordance with the present invention.

The conveyor used in such a continuous process should bring the potato slices from one zone or stage to the next as shown by the apparatus depicted in the Figure. This may be accomplished in the infrared precook and browning regions by wire or mesh belts 16 and 20, respectively, which are preferably stainless steel coated with TEFLON or another non-stick material as the conveyor. Wire or mesh belts are flexible and they allow the potato slices to be evenly heated by the infrared heat treatments. In accordance with the present invention, the potato slices do not curl during the precook and/or cooking stages and therefore do not extend upward too close to the infrared energy sources. Undesirable over-browning or actual burning are thus avoided in the present invention.

The arrangement of the potato slices on the conveyor should be considered during processing since any overlap among potato slices on the conveyor may result in some potato slices being uncooked. Another consideration is that potato slices having different thicknesses interfere with good control over temperature. To maintain product consistency, it is desirable to maintain both a relatively constant thickness of the potato slice and a relatively constant apparatus temperature.

For the same reason, the movement of air inside the apparatus depicted in the Figure should preferably be controlled. It is advisable to maintain a constant temperature within the microwave cooking area in particular. Thus, a portion or all of the apparatus depicted in the Figure may be enclosed and the interior barometric pressure maintained substantially constant to prevent the movement of air, especially in the microwave cooking region 10. A slightly negative pressure can be imposed advantageously by which water vapor and other gases emitted by the potatoes during cooking are drawn off through a port 4 and yet a relatively constant temperature within the cooking region 10 is maintained. Another way of achieving a relatively constant air temperature within the apparatus or at least within the cooking region 10 is to provide several pipes around the conveyors 16, 18 and 20 through which warm air is forced. For example, approximately 110° F. air may be used to help maintain consistency of the final potato product. However, it will be understood that other methods are equally suitable in the practice of the present invention.

In accordance with the present invention, the potato slices are first subjected to an infrared precook procedure. Infrared energy as a source of heat is advantageous because of its high heat transfer capacity, instant heating with no warming-up period and penetration directly into the slices. This allows for fast heat treatment and fast regulation response, as well as compact and flexible oven constructions with low working temperatures and high energy efficiencies. Good heat penetration also allows the speed of the conveyor belt to be increased. The infrared energy may be low intensity or high intensity, however, if low intensity energy is used a longer pre-cook time is necessary. Approximately 50% of the moisture is removed from the potato slice during this step. High intensity illumination at a wavelength of about 4 to 6 microns is preferred.

The exact time for each stage of the subject process cannot be accurately predicted since it depends on a variety of factors, however, the infrared precook stage is designed to gradually heat the outside and, to a limited extent the inside, of the potato slices. The time period for the precook step is determined by a number of factors including the distance of a plurality of infrared sources 2 to the potato slices and the conveyor speed. The infrared precook time generally ranges from about 30 seconds to 5 minutes, and preferably requires approximately 1 minute. The use of an infrared precook step is particularly advantageous because it makes the overall cooking process more efficient than if the cooking process was conducted entirely by microwaves.

Suitable means for supplying infrared radiation in the precook step of the present invention include: glazed ceramic surfaces such as tiles; strip heaters; quartz tubes; and any "reflective" type device. Lamps may also be used to generate the infrared energy necessary for the precook stage. It is possible to use a larger number of lamps which are approximately four inches long or a smaller number of 20-inch lamps. However, the 20-inch lamp provides less uniform heat distribution. Grids may also be used with the lamps to collimate the lightwaves. Preferably, a plurality of glazed ceramic panels 2 are used in the practice of the present invention to provide the infrared radiation because they can be easily cleaned or made to be self-cleaning and they allow for more even temperature control.

The glazed ceramic panels 2 typically contain one or more electrical resistance coils. From the passage of electric current, these coils develop heat energy in the ceramic panel which then radiates the energy from its surface. The temperature of the ceramic panel may be regulated by a suitable proportioning controller and a thermocouple set in the ceramic panel. Since the ceramic is a prime reservoir of heat, there is no substantial fluctuation in heat output as the electric current to the coils is cycled on and off by the controller.

Either alternating current or direct current at any suitable voltage may be used in the practice of the present invention. Suitable voltages include 110, 220, 440, 550 and the like. All commercially available wattage panels are also suitable, for example, those emitting 5 to 30 watts per square inch. It is preferrable that the infrared ceramic panels 2 have a peak emission at wavelengths from 4 to 6 microns in the long infrared region, however, ceaamic panels having a peak wavelength longer than one micron are also suitable in the practice of the present invention.

The distance from the ceramic panels 2 to the precooking potato slices on the belt 16 may range anywhere from about one inch to about four inches which is sufficient to produce a high intensity illumination of the precooking slices. The preferred distance is from about 1.5 to about 2.5 inches.

After the infrared precook stage, the conveyor 16 transports the potato slices to the microwave cooking stage in accordance with the present invention. The conveyor belt 18 during the microwave cooking stage is preferably a TEFLON coated fiberglass belt.

The microwave cooking stage is designed to remove most of the remaining moisture from the potato slices and thus complete the cooking process without burning the potato slices. Microwave heating depends in large part on the presence of water in the item to be heated. Water is driven off during the heating process. Thus, moisture bearing food pieces that are traditionally cooked by frying to decrease their moisture content and brown their surface are suitable in the practice of the present invention. The entire microwave cooking time can vary from 30 seconds to 5 minutes and is preferably in the range of 1 to 2 minutes. With a properly configured cavity 10 wherein the cooking occurs, microwave energy is more efficient than infrared in eliminating the remainder of the water in the potato slices.

Microwave ovens which are commercially available for home as well as industrial use may be suitably employed in the practice of the present invention. The microwaving means may be suitably designed to operate at either 915 MHz or 2450 MHz and may have one or more modules having output powers between 1 kilowatt and 50 kilowatts, individually. The total power needed in the microwave cooking stage is a variable depending on the quantity of potato slices being cooked; a general range is about 5 to 1000 kilowatts, although about 100 kilowatts is typically used.

Microwave choke sections 12 are needed to prevent the microwave radiation from leaking out of the cavity 10 forming the cooking section, thereby providing a safe environment for the operators. The choke section 12 may be composed of any suitable means such as $\frac{1}{4}$ inch aluminum dowel pins aligned in several rows with approximately 1000 pins per row. A microwave feed port 8 schematically represents at least one place where the microwave energy from a source 22 such as a magnetron may enter the microwave cooking cavity 10.

Regardless of the type of heat source used, steam is produced during the cooking phase. Steam tends to disperse the cooking energy before it reaches the potato slice, thus interfering with an even heat distribution. This effect is undesirable so appropriate methods may optionally be employed to eliminate this disadvantage. As indicated earlier, one possible method for eliminating the steam produced during cooking is to maintain a slight negative pressure in the cooking region 10 or within the entire processing apparatus. A hot air flush port 4 is provided as either an air exhaust or intake to remove moisture which builds up in the enclosed microwave cooking region 10.

After the microwave cooking stage, the potato slices are transferred onto another coated stainless steel belt 20 for transport through an infrared browning region. The purpose of this step is to brown the surface of the potato slices, that is, change the surface chemistry of the potato slice so that the potato chips have the proper color and flavor.

Any suitable means for providing infrared energy may be used in the browning stage; however, one or more infrared heating panels 14 similar to the panels 2 are preferred. The panels 14 are generally positioned about 4 to 20 inches from the conveyor 20 holding the potato slices. The panels' peak emission wavelength is preferably 4 to 6 microns. The time for the infrared browning stage generally ranges from about 20 seconds to 5 minutes, and preferably requires approximately 1 minute. As in the infrared precook stage, any suitable voltage may be used for the panels 14 in the infrared browning stage.

The amount and depth of the surface browning resulting from the infrared radiation is readily controlled through adjustment of the temperature of the emitting source. The emission wavelength and the depth of penetration into the potato slices are inversely related to the temperature of the emitting source; the hotter the emitting source, the shorter the wavelength, and the thinner the layer of surface browning or crusting.

The precise heating times and the temperatures and intensities of the heat sources for the precook, cooking and browning stages can be readily determined by one of ordinary skill in the art from several test runs. Those parameters are interrelated, thus, a modification of one parameter would likely require adjustment of one or both of the others. Additional variables which must be considered include the variety of the potato selected, the thickness of the individual potato slices, and the distance between the potato slices and the energy sources. Further variables that determine the best transfer of heat to the potato slices include: the number and arrangement of microwave sources used during the cooking stage, the distance that the infrared sources should be set apart to provide even heat distribution, and the speed of the conveyors 16, 18 and 20. Whether a cooling period occurs between any of the stages, whether the heating energy is applied in cycles, i.e., a strobe effect, and the like should also be considered. A variation of any one of these variables would likely impact several of the others.

The potato chips prepared by the process of the present invention have no added fat and are a low calorie product. The potato slices are simply cooked to a crisp. There are no additives, preservatives nor oils needed in the present process, thus, there is less chance of bacteria growth in the potato chips since there is no oil present.

Optionally, an ultraviolet light sterilizing area or tunnel may be added at the end of the conveyor whereby the final potato chip product would be exposed to ultraviolet light just prior to packaging. The potato chips may thus be preserved by maintaining them in a sterile condition within a suitable hermetically sealed package without the problem of exposing the sealed package to high bactericidal temperatures. If potato chips produced in accordance with the present invention are packaged in the presence of a suitably intense ultraviolet light, the shelf life of the potato chip product may extend from several months to several years.

Further advantages of the present invention are that there is no consumption of materials, other than potatoes; and since there is no oil to be changed during the cooking process, there is none of the safety hazards associated with working around hot oil. Thus, lower insurance costs are expected. Also the energy consumption of the present process is less than conventional cooking or heating processes.

The following example illustrates an embodiment of the present invention:

EXAMPLE

Fresh, raw potatoes are peeled, sliced, water washed and dried. The raw potato slices are then placed on a stainless steel wire mesh conveyor where they are sprayed with a salt solution. The conveyor then exposes the pretreated potato slices to a precook stage in an open oven wherein high intensity infrared energy is emitted from ceramic panels using 480 volts. The infrared energy has a peak wavelength of 5 microns and the ceramic panels are positioned about 2 inches from the sliced potatoes. The speed of the conveyor is adjusted so that the precook lasts about 1 minute. The potato slices are then transferred from the stainless steel conveyor belt to a TEFLON-coated fiberglass belt and are exposed to 24 kilowatts of microwave power at 2450 MHz. The microwave cooking stage lasts approximately 1 minute. The potato slices are then transferred from the TEFLON-coated fiberglass belt onto a stainless steel belt for infrared browning. The infrared energy is emitted from ceramic panels in an open oven using 480 volts. The ceramic panels for browning are positioned approximately eight inches from the potato slices. The potato slices are then exposed to ultraviolet radiation and immediately packaged. The microwave prepared chips have an appearance similar to potato chips prepared by deep fat frying in that their surface texture, sheen and presence of air pockets are similar to the conventionally prepared product.

While the invention has now been described with reference to several preferred embodiments, those skilled in the art will appreciate that various substitutions, omissions, modifications, and changes may be made without departing from the scope or spirit hereof. Accordingly, it is intended that the foregoing description be considered merely exemplary of the invention and not a limitation thereof.

What is claimed is:

1. A process for preparing a cooked food product without the use of oil, said process consisting essentially of:
   (a) subjecting food pieces to a sufficient amount of infrared energy to warm the exterior of said food pieces;
   (b) exposing said food pieces to microwave energy for a period of time sufficient to warm the interior of said food pieces; and then
   (c) exposing said food pieces to a sufficient amount of infrared energy to achieve browning of said food pieces.

2. The process as claimed in claim 1, wherein said food pieces are first coated with a brine solution.

3. The process as claimed in claim 1, said process being conducted as a continuous process wherein said food pieces are transported from the first area of infrared energy which warms the exterior of said food pieces to a second area where microwave energy is used to warm the interior of said food pieces, and followed by transporting said food pieces to a third area where said food pieces are exposed to infrared energy to brown said food pieces.

4. The process as claimed in claim 1, wherein the infrared energy in step (a) has a peak wavelength of about 4 to 6 microns.

5. The process as claimed in claim 4, wherein the infrared energy in step (a) is applied for a time period ranging from about 30 seconds to five minutes.

6. The process as claimed in claim 1, wherein the microwave energy in step (b) is in the range of about 915 MHz to about 2450 MHz.

7. The process as claimed in claim 6, wherein the microwave energy has a total power ranging from 5 kilowatts to 1000 kilowatts.

8. The process as claimed in claim 6, wherein the microwave energy is applied for a time period ranging from 30 seconds to five minutes.

9. The process as claimed in claim 1, wherein the infrared energy in step (c) has a peak wavelength of about 4 to 6 microns.

10. The process as claimed in claim 9, wherein the infrared energy in step (c) is applied for a time period ranging from 20 seconds to five minutes.

11. The process as claimed in claim 1, wherein the process is conducted in a closed system having positive pressure.

12. The process as claimed in claim 1, wherein said food pieces are sliced potato pieces.

13. A process for preparing a cooked food product without the use of oil, said process comprising:
 (a) subjecting food pieces to a sufficient amount of infrared energy to warm the exterior of said food pieces;
 (b) exposing said food pieces to microwave energy for a period of time sufficient to warm the interior of said food pieces;
 (c) exposing said food pieces to a sufficient amount of infrared energy to achieve browning of said food pieces; and then
 (d) subjecting said food pieces to ultraviolet light.

14. A process for preparing crisp, chip-type snack food products from potato slices without the use of oil, said process consisting essentially of:
 (a) subjecting sliced potato pieces to infrared energy for about 30 seconds to 5 minutes to warm the exterior of said sliced potato pieces;
 (b) exposing said sliced potato pieces to microwave energy at a frequency of about 915 MHz to about 2450 MHz for about 30 seconds to 5 minutes to warm the interior of said sliced potato pieces; and then
 (c) exposing said sliced potato pieces to infrared energy for about 20 seconds to five minutes to achieve browning of said sliced potato pieces.

15. The process as claimed in claim 14, wherein said sliced potato pieces are first coated with a brine solution.

16. The process as claimed in claim 14, said process being conducted as a continuous process wherein said potato pieces are transported from the first area of infrared energy which warms the exterior of said sliced potato pieces to a second area where microwave energy is used to warm the interior of said potato pieces, and followed by transporting said sliced potato pieces to a third area where said sliced potato pieces are exposed to infrared energy to brown said sliced potato pieces.

17. A process for preparing crisp, chip-type snack food products from potato slices without the use of oil, said process comprising:
 (a) subjecting sliced potato pieces to infrared energy for about 30 seconds to 5 minutes to warm the exterior of said sliced potato pieces;
 (b) exposing said sliced potato pieces to microwave energy at a frequency of about 915 MHz to about 2450 MHz for about 30 seconds to 5 minutes to warm the interior of said sliced potato pieces;
 (c) exposing said sliced potato pieces to infrared energy for about 20 seconds to five minutes to achieve browning of said sliced potato pieces; and then
 (d) subjecting the chip-type snack food product to ultraviolet light.

* * * * *